(12) United States Patent
Showalter

(10) Patent No.: US 9,326,630 B1
(45) Date of Patent: May 3, 2016

(54) SHOE HORN APPARATUS AND METHOD

(71) Applicant: Edward Showalter, Taft, CA (US)

(72) Inventor: Edward Showalter, Taft, CA (US)

( * ) Notice: Subject to any disclaimer, the term of this patent is extended or adjusted under 35 U.S.C. 154(b) by 0 days.

(21) Appl. No.: 14/523,814

(22) Filed: Oct. 24, 2014

(51) Int. Cl.
*A47G 25/82* (2006.01)
*B25J 15/00* (2006.01)

(52) U.S. Cl.
CPC *A47G 25/82* (2013.01); *B25J 15/00* (2013.01)

(58) Field of Classification Search
CPC ......... A47G 25/80; A47G 25/82; A43B 9/00; A43B 3/00; B25J 15/00; A61H 3/0288
See application file for complete search history.

(56) References Cited

U.S. PATENT DOCUMENTS

| | | | | |
|---|---|---|---|---|
| 3,591,226 | A * | 7/1971 | Elmore, Jr. | B25J 1/04 223/119 |
| 4,709,839 | A * | 12/1987 | Tucker | A47G 25/82 223/119 |
| 4,966,316 | A * | 10/1990 | George | A47G 25/82 135/66 |
| 5,392,800 | A * | 2/1995 | Sergi | A47G 25/82 135/65 |
| 5,636,650 | A * | 6/1997 | Kroeze | A45B 3/00 135/66 |
| 6,386,216 | B1 * | 5/2002 | Cubelli | A61H 3/02 135/66 |
| 7,337,933 | B1 * | 3/2008 | Klinberg | A47G 25/82 223/118 |
| 8,714,170 | B1 * | 5/2014 | Bonne | A45B 3/00 135/66 |
| 2004/0255995 | A1 * | 12/2004 | Garrett | A45B 7/005 135/66 |

OTHER PUBLICATIONS www.shoe-horn.com; (See 1st page of attached NPL document), Feb. 20, 2015.
www.jcrew.com; (See 2nd page of attached NPL document), Feb. 20, 2015.
http://www.carolwrightgifts.com/personal-care/support-mobility/combo-dressing-stick/25685.cfm?key=5G00215B&cm_mmc=PaidSearch-_-GooglePLA-_-FreeShip-_-25685&gclid=CMaWiJrT7sMCFYhhfgodtw8Aqw; (See p. 3-4 of attached NPL document).
http://www.mrportercom/en-us/mens/shoes/shoe_accessories/shoe_horns; (See p. 5-6 of attached NPL document), Feb. 20, 2015.
http://www.containerstore.com/shop/closet/shoeStorage?productId=10031931&N=153+1000082; (See p. 7-8 of attached NPL document), Feb. 20, 2015.
http://www.homedepot.com/p/HealthSmart-Telescopic-Shoe-Horn-640-9005-0000/203284013; (See p. 9-10 of attached NPL document), Feb. 20, 2015.
http://www.ikea.com/us/en/catalog/products/00064662/; (See p. 11 of attached NPL document), Feb. 20, 2015.
http://www.target.com/p/mabis-healthcare-long-handle-shoe-horn-silver/-/A-13073733?Ink=Rec|pdp|viewed_bought|pdph1; (See p. 12-14 of attached NPL document), Feb. 20, 2015.

(Continued)

*Primary Examiner* — Ismael Izaguirre
(74) *Attorney, Agent, or Firm* — Cionca Law Group P.C.; Marin Cionca

(57) ABSTRACT

A shoe horn apparatus comprising: a handle at one end, a shoe horn at the other end and a shaft mounted between the handle and the shoe horn, wherein the shaft is attached at its upper end to the handle and at its lower end to the shoe horn; a spring loaded actuating member mounted near the handle, such that it can be actuated by a user with the same hand the user holds the handle with; a spring loaded grip member mounted near the shoe horn such that it can grip the back of a shoe between the back of the shoe horn and the grip member upon actuation or release of the actuating member by a user; and, a transmission mechanism mounted between the actuating member and the grip member.

20 Claims, 13 Drawing Sheets

(56) References Cited

OTHER PUBLICATIONS http://www.heelingtouch.com/category/Shoe-Horns-Bags-13; (See p. 15-17 of attached NPL document), Feb. 20, 2015.
http://www.activeforever.com/hip-surgery-and-injury; (See p. 18 of attached NPL document), Feb. 20, 2015.
http://www.allegromedical.com/daily-living-aids-c519/dress-ez-dressing-stick-combines-dressing-stick-and-shoehorn-p185943.html; (See p. 19-20 of attached NPL document), Feb. 20, 2015.
http://www.pattersonmedical.com/app.aspx?cmd=getProduct&key=IF_921028754; (See p. 21 and 27 of attached NPL document), Feb. 20, 2015.
http://www.footfitter.com/c/shoe-horns.html; See p. 22 of attached NPL document), Feb. 20, 2015.
http://www.essentialaids.com/dressing/shoehorns/shoe-horn-with-spring.html; (See p. 23 of attached NPL document), Feb. 20, 2015.
http://www.activeforever.com/dressing-aids; (See p. 24 of attached NPL document), Feb. 20, 2015.
http://patienttherapy.healthcaresupplypros.com/the2070; (See p. 25-26 of attached NPL document), Feb. 20, 2015.
http://www.bitsandpieces.com/product/telescoping_shoe_horn; (See p. 28 and 36 of attached NPL document), Feb. 20, 2015.
http://www.fashionablecanes.com/shoe-horns.html; (See p. 29-32 of attached NPL document), Feb. 20, 2015.
http://www.allegromedical.com/daily-living-aids-c519/shoehorn-with-t-handle-p192815.html; (See p. 33 of attached NPL document), Feb. 20, 2015.
http://www.sportaid.com/dress-ez.html; (See p. 34-35 of attached NPL document), Feb. 20, 2015.

* cited by examiner

SHOE HORN APPARATUS AND METHOD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to shoe horn systems and methods, and more particularly to a shoe horn apparatus and method with gripping capabilities.

2. Description of the Related Art

It is well known that it is very inconvenient for most people and very difficult for people with limited trunk movement or other physical limitations to put shoes on using traditional shoe horns. First, people have to reach for the shoes under furniture pieces such as beds or desks. Second, they have to position the shoes near the feet. Third, they have to bend over to place the shoe horn into the shoe. Forth, they often need to bend over to pull the shoe up in order for the feet to slide into the shoe. While the prior art provides some long shoe horns with shafts and handles that may be capable of solving the third problem described above, they are deficient at solving the first two problems, and impotent at solving the fourth problem.

Thus, there is a need for a new and improved shoe horn apparatus and method that solve all the problems described above effectively and conveniently.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment a shoe horn apparatus is provided comprising: a handle at one end, a shoe horn at the other end and a shaft mounted between the handle and the shoe horn, wherein the shaft is attached at its upper end to the handle and at its lower end to the shoe horn; a spring loaded actuating member mounted near the handle, such that it can be actuated by a user with the same hand the user holds the handle with; a spring loaded grip member mounted near the shoe horn such that it can grip the back of a shoe between the back of the shoe horn and the grip member upon actuation or release of the actuating member by a user; and, a transmission mechanism mounted between the actuating member and the grip member. Thus, some of the advantages are that a user does not need to bend over when pulling the shoes from under a furniture object, placing the shoes near or under the feet, placing the shoe horn into the shoe and pulling the shoe up to aid the sliding of the foot into the shoe.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1:
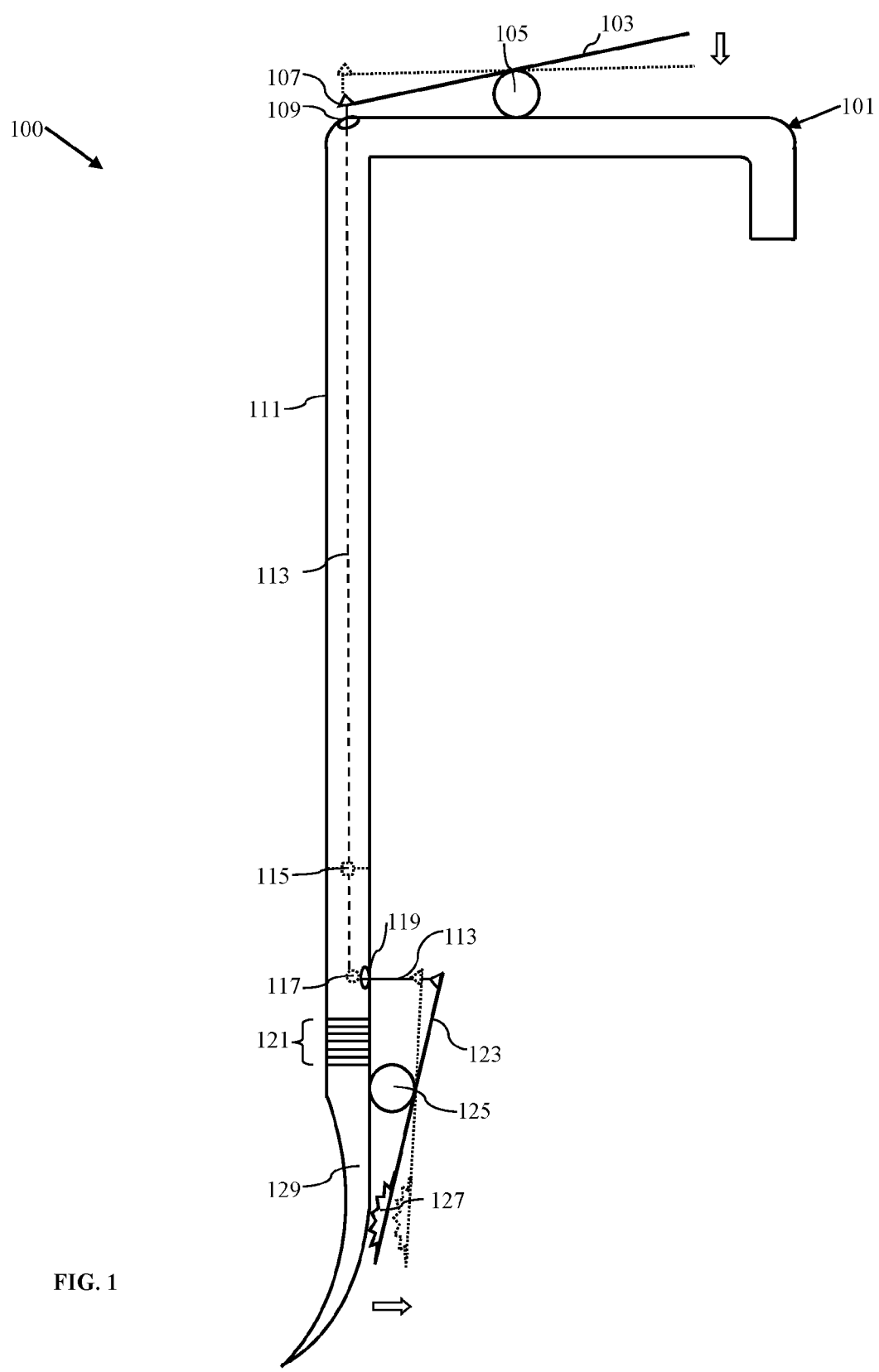
FIG. 1 illustrates a side view of a normally-closed shoe horn apparatus, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 103 and 303, etc.) possess the same characteristics and are subject to the same structure and function. If there is a difference between correspondingly labeled elements that is not pointed out, and this difference results in a non-corresponding structure or function of an element for a particular embodiment, then the conflicting description given for that particular embodiment shall govern.

FIG. 1 illustrates a side view of a normally-closed shoe horn apparatus, according to an embodiment. As shown, the shoe horn apparatus 100 includes a handle 101 associated with a shaft 111, at the end of which, a shoe horn 129 is attached. The handle 101 and shaft 111 may be hollow tubes, integrally associated, at, for example, a ninety degrees angle, as shown, and may be made for example from stainless steel or plastic. A spring 121, 221, or 321 may be interposed between the shaft 111 and shoehorn 129, to give the shoe horn apparatus 100 flexibility when used by a user as it will be described later herein. The spring 121 may be a tension coil spring and may be made from brass. The shoe horn 129 is known in the art and may be made for example from plastic or stainless steel.

The shoe horn apparatus 100 includes an actuating member 103, which in its normal, non-actuated position may have, as shown, a slanted orientation. As shown, to actuate it, a user would need to simply push down (with the thumb for example) the distal end of the actuating member 103, which would cause its proximal end 107 to move up. This movement is facilitated by a spring loaded pivotal connection 105, which associates the actuating member 103 with the handle 101. Preferably, the spring loaded pivotal connection 105 is a torsion spring having an end attached to the handle 101 and the other end attached to the actuating member 103. By using the spring loaded configuration, the actuating member 103 will return to its original position (shown in solid line) upon the user ending her push down action. The actuating member 103 may for example be a bar or a rod made from stainless steel.

The proximal end 107 of the actuating member 103 may be associated with an end of a wire or string 113, which may be passed through an upper opening 109 inside the hollow shaft 111. Inside the shaft 111, the wire 113 may be centered and/or guided through one or more eye hooks 115 and/or rollers 117. The rollers may help reduce friction when the pull wire 113 runs up and down inside the shaft 111 upon actuating, releasing, respectively, of the actuating member 103 by the user. As shown, the wire 113 is preferably stretched, exits from the shaft 111 through a lower opening 119 and has its opposite end attached to the upper end of the grip member 123. The wire 113 may for example be a 150 pound fishing line.

The grip member 123 may be associated with the shaft 111 in a similar fashion, using a spring loaded pivotal connection 125, as described above when referring to actuating member's 103 association with the handle 101. Here too, preferably, the spring loaded pivotal connection 125 is a torsion spring having an end attached to the shaft 111 and the other end attached to the grip member 123. By using the spring loaded configuration, the grip member 123 will return to its original position (show in solid line) upon the user ending her push down action on the actuating member 103. The grip member 103 may for example be a bar, a rod, a plate or a combination thereof, made from stainless steel or plastic. As shown, the grip member 123 may have at its lower end a grip portion (e.g., a grip pad) 127 having indents, ridges, crevices or the like, as shown by 227-a in FIG. 2, on the surface facing the shoe horn 129, to increase friction grip on the portion of the outside of a shoe with which the grip portion comes in contact (see 227 of FIG. 2). Preferably, the indents or ridges 227-a on the grip portion 227 have smooth edges such that to prevent damage (e.g., cuts or punctures) to common materials (e.g., leather or fabric) commonly used in shoes.

Figures 2, 2A:
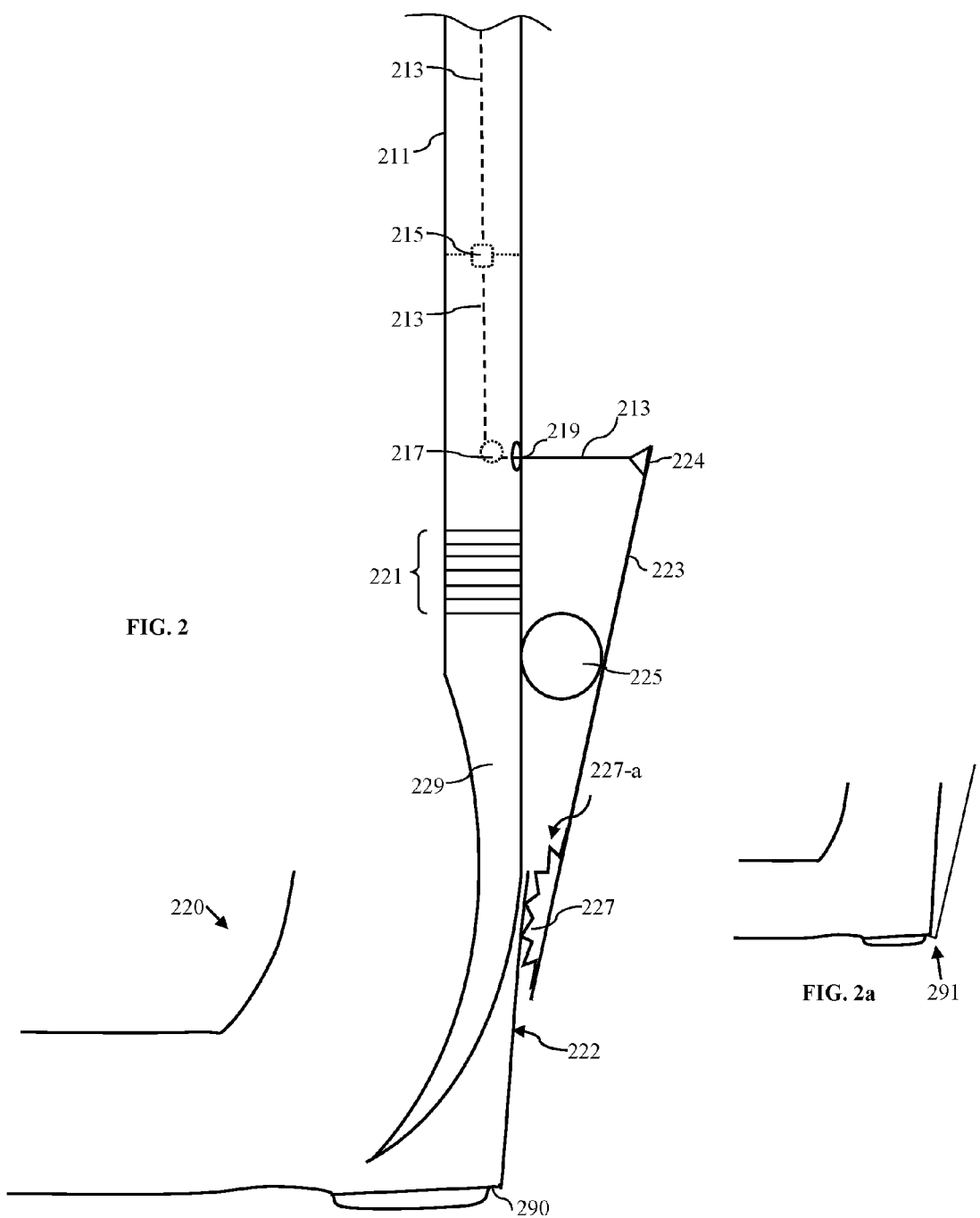
FIG. 2 illustrates an enlarged side view of the bottom portion of the shoe horn apparatus from FIG. 1, in use, according to an embodiment.
FIG. 2*a* illustrates an alternative design for the grip member 123 of the shoe horn apparatus from FIG. 1, in use, according to an embodiment.

Reference will be now made to FIG. 1 and FIG. 2 to describe the functions of this, normally-closed shoe horn apparatus. This embodiment is said to be normally-closed because the grip portion 127 of the slanted grip member 123, as shown in FIG. 1 in solid line, resides adjacent to back of shoe horn 129 when the actuating member 103 is in its normal, non-actuated state, shown in solid line. By contrast, when a user pushes down the distal end of actuating member 103, as described above, the actuating member 103 moves to an actuated state (see dotted line). This causes the wire 113 to pull the upper end of grip member 123 toward the shaft 111, and thus, causing the lower end with the grip portion 127 to open (i.e., move away from the shoe horn 129; see dotted line representation of the grip member 123 and grip portion 127).

A user may want to push (e.g., with user's thumb) on the actuating member 103 while holding on the shoe horn apparatus 100 in user's hand by its handle 101, and, for example, willing to grab a shoe from underneath a bed, a desk and so on. With the grip member in open position (see dotted line in FIG. 1), the user may insert (see FIG. 2) the shoe horn 229 inside the shoe 220, while ensuring that the grip member 223 and its grip portion 227 are outside the shoe 220. Next, by simply releasing the actuating member 103, the grip member 223 will close, allowing the grip portion 227 to friction grip onto the back of the shoe. Next, the user can drag the shoe near user's foot for example. This function and the other described herein, are particularly useful for people with various degrees of disability, such as people with back pain, elderly, wheelchair bound individuals, persons who had hip or knee surgery, people having weight issues that prevent bending, women who are pregnant, and so on. As another example, the apparatus described herein and its functions may assist pregnant women who are in late pregnancy, and thus have difficulty bending over, to put shoes on or assist their young children (e.g., 2-3 year old) to put their shoes on.

Next, the user may use the shoe horn apparatus 100 to put the shoe on by ensuring that the shoe horn 229 is inside the back 222 of the shoe 220 and the grip lever 223 and its grip portion 227 are outside the back 222 of the shoe 220, and in close position as shown in FIG. 2. Next, the user will slide down the foot inside the shoe 220 with the heel sliding on the front smooth concave surface of the shoe horn 229, while pulling upwards the shoe horn apparatus 100, and thus the back 222 of the shoe squeezed between the back of the shoe horn 229 and the grip portion 227, as shown in FIG. 2.

It should be understood that the strength of the grip onto the back 222 of the shoe is controlled primarily by the torsion springs 105 and 125 and the configuration of the grip portion 127. Routine experimentation by one of ordinary skills in the art can be used for proper grip calibration (e.g., choosing the appropriate torsion springs).

The spring 221 described earlier, gives the shaft 211 the angle flexibility the user may need, such as when the shoe 220 is not ideally aligned with the shaft 211 during attempt by the user to put the shoe 220 on.

It should be noted that the transfer of motion from the actuating member 103 to the grip member 123 may be accomplished also using alternative mechanical configurations. For example, the wire or string with rollers and/or eye hooks described may be replaced with a series of steel rods properly articulated to achieve the same result, in which case, it may be sufficient to have only one of the pivotal connections 105 and 125 spring loaded to return the actuating and grip members (103 and 123) to original positions.

The shoe horn apparatus 100 may have various lengths to account for example for differences in the height of users. For example, the shaft 111 may be 19, 24 or 31 inches in length. When circular, the shaft 111 may have a ¾ of an inch diameter.

FIG. 2a illustrates an alternative design for the grip member 123 of the shoe horn apparatus from FIG. 1, in use, according to an embodiment. As shown, instead of having a grip portion 127/227, the grip member 123/223 may be configured to have a hook-like end 291 that can reach and grab onto the lip 290 of the shoe heel.

Figure 3:
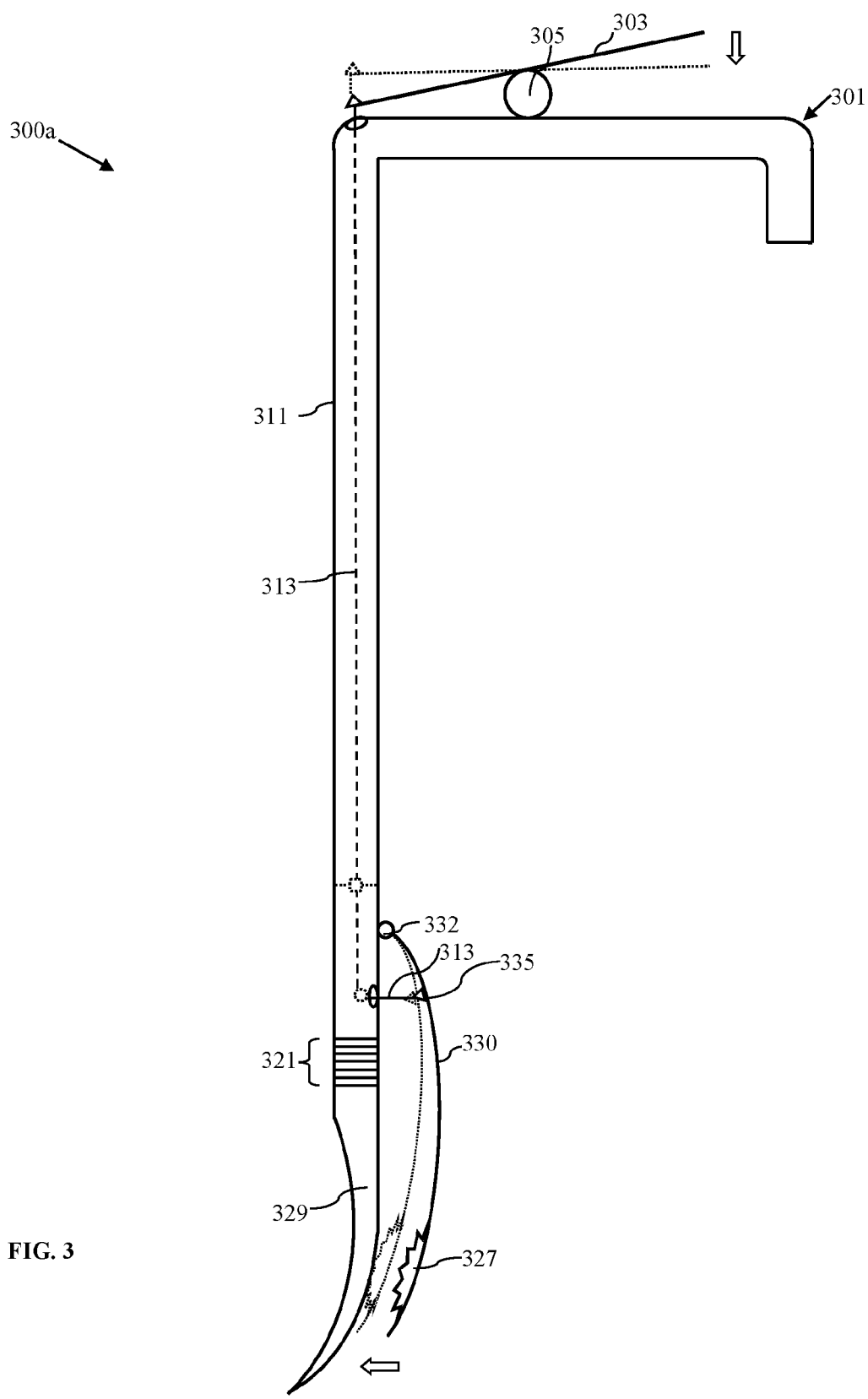
FIG. 3 illustrates a side view of a normally-open shoe horn apparatus, according to an embodiment.
Figure 4:
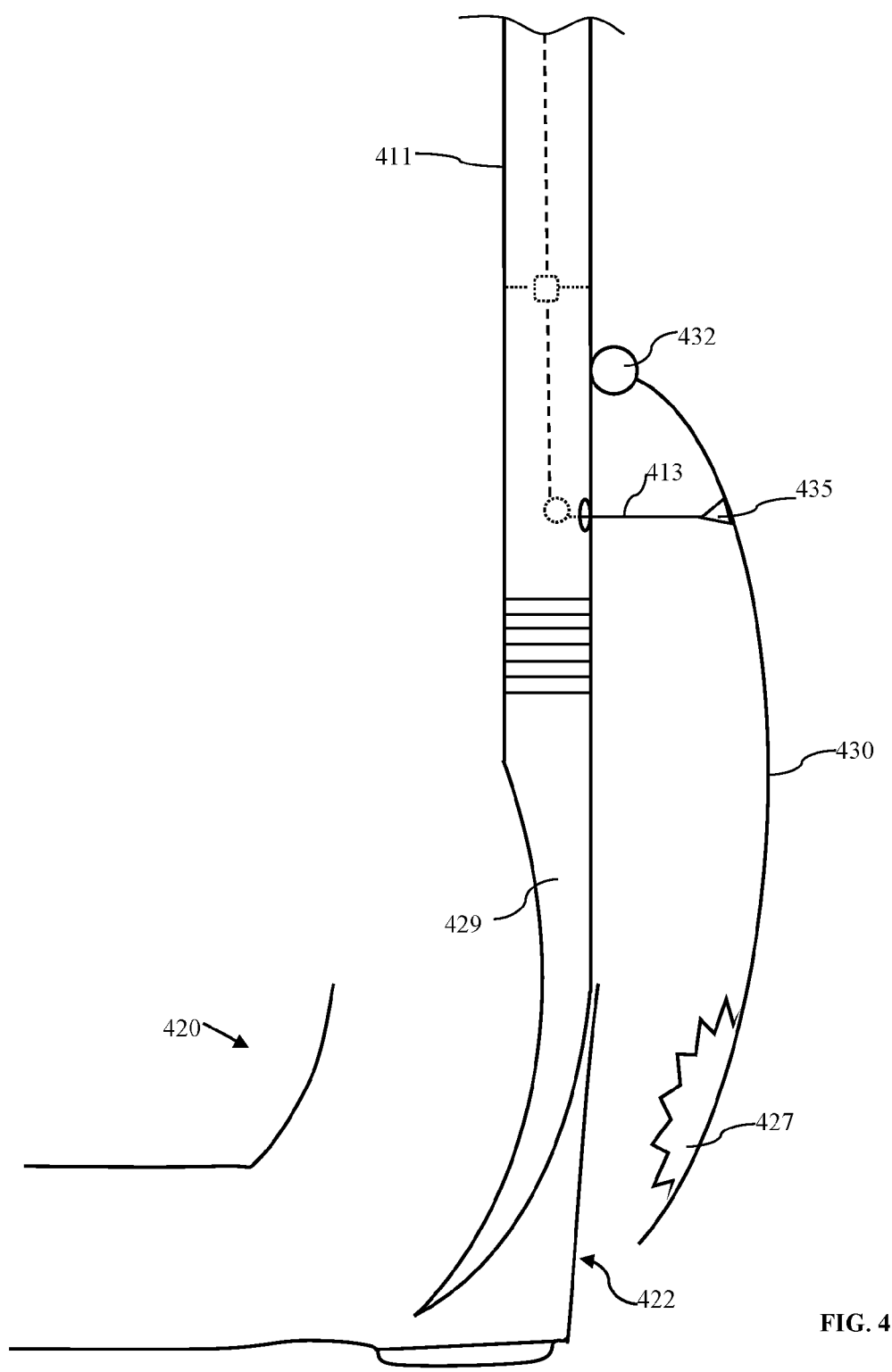
FIG. 4 illustrates an enlarged side view of the bottom portion of the shoe horn apparatus from FIG. 3, in use, according to an embodiment.

FIG. 3 illustrates a side view of a normally-open shoe horn apparatus, according to an embodiment. FIG. 4 illustrates an enlarged side view of the bottom portion of the shoe horn apparatus from FIG. 3, in use, according to an embodiment. Reference will be now made to FIG. 3 and FIG. 4 to describe the normally-open shoe horn apparatus. As shown, the normally-open shoe horn apparatus 300a may have some identical structural elements as the normally-closed shoe horn apparatus 100 from FIG. 1 and some structural elements that are different. The description from above of the identical elements (e.g., actuating member 103, shaft 111/211, etc) and their functions shown in FIGS. 1-2 is incorporated hereby by reference, and thus, applies to corresponding elements shown in FIGS. 3-4 (e.g., actuating member 303, shaft 311/411, etc). The description of the different structural elements and their functions is presented hereinafter.

It should be observed that the normally-closed grip member 123/223 is now replaced with a normally-open grip member 330/430. That is, when no user action on the actuating member 303 is present, the grip member 330/430 rests away (see exemplary position depicted in solid line) from the shoe horn 329/429, such that the shoe horn 329/429 may be inserted inside the shoe 420 with the grip member 430 remaining outside the back 422 of the shoe. To grab and pull the shoe 420, the user would need to close the grip member 430, by pushing down the actuating member 303, such as the grip portion 327 reaches and grips into the back 422 of the shoe 420. It should be observed that when the user pushes down (e.g., with user's thumb or by a hand squeeze) the actuating member 303, the wire 313, which at its lower end is attached to the grip member 330 at connection point 335, pulls the grip member 330 toward the shoe horn 329 (see exemplary close position depicted in dotted line in FIG. 3).

It should be noted that there is a correlation between the amount of force applied by the user onto actuating member 303 and the amount of force with which grip member 330/430 and its grip portion 327/427 presses onto the back 422 of the shoe. This may be an advantage of this embodiment, assuming that lack of strength in the hand is not one of the user's impairments. For example, if the shoe escapes the grip when pulling the shoe up the foot or from under a table or bed, the user would simply need to push/squeeze the actuating member 303 a little harder.

As shown, the normally-open grip member 330 may be attached to the shaft 311 using a spring loaded pivotal connection 332, which may be (e.g., to save costs) a torsion spring attached at one end to the shaft 311 and at the other end to the upper end of grip member 330, similarly as described earlier when referring to FIG. 1. The spring loaded pivotal connection 332 ensures that the grip member 330 returns to its normal, open position (see solid line grip member 330) upon release of actuating member 303 by the user.

Thus, when a user wishes to put her shoes on, using the normally-open shoe horn apparatus 300a, the user may hold the apparatus in user's hand by its handle 301, and since the grip member 330/430 is by default in open position as described above (see solid line grip member in FIGS. 3 and 4), the user may simply insert (see FIG. 4) the shoe horn 429 inside the shoe 420, while ensuring that the grip member 430 and its grip portion 427 are outside the shoe 420. Next, by simply pushing down the actuating member 303, the grip member 430 will close, allowing the grip portion 427 to friction grip onto the back 422 of the shoe 420. Next, the user can drag the shoe 420 near user's foot from underneath a bed, a desk and so on. Again, this function and the other described herein, are particularly useful for people with various degrees of disability, such as people with back pain, elderly, wheelchair bound individuals, persons who had hip or knee surgery, people having weight issues that prevent bending, women who are pregnant, and so on. As another example, the apparatus described herein and its functions may assist pregnant women who are in late pregnancy, and thus have difficulty bending over, to put shoes on or assist their young children (e.g., 2-3 year old) to put their shoes on.

Next, the user may use the shoe horn apparatus 300a to put the shoe 420 on her foot by ensuring that the shoe horn 429 is inside the back 422 of the shoe 420 as shown and the grip lever 430 and its grip portion 427 are outside the back 422 of the shoe 420. Next, the user will slide down the foot inside the shoe 420 with the foot heel sliding on the front smooth concave surface of the shoe horn 429, while closing the grip member 430 by pressing down onto the actuating member 303 (see dotted line actuating and grip members in FIG. 3) and pulling upwards the shoe horn apparatus 300a, and thus the back 422 of the shoe squeezed between the back of the shoe horn 429 and the grip portion 427.

Figure 5:
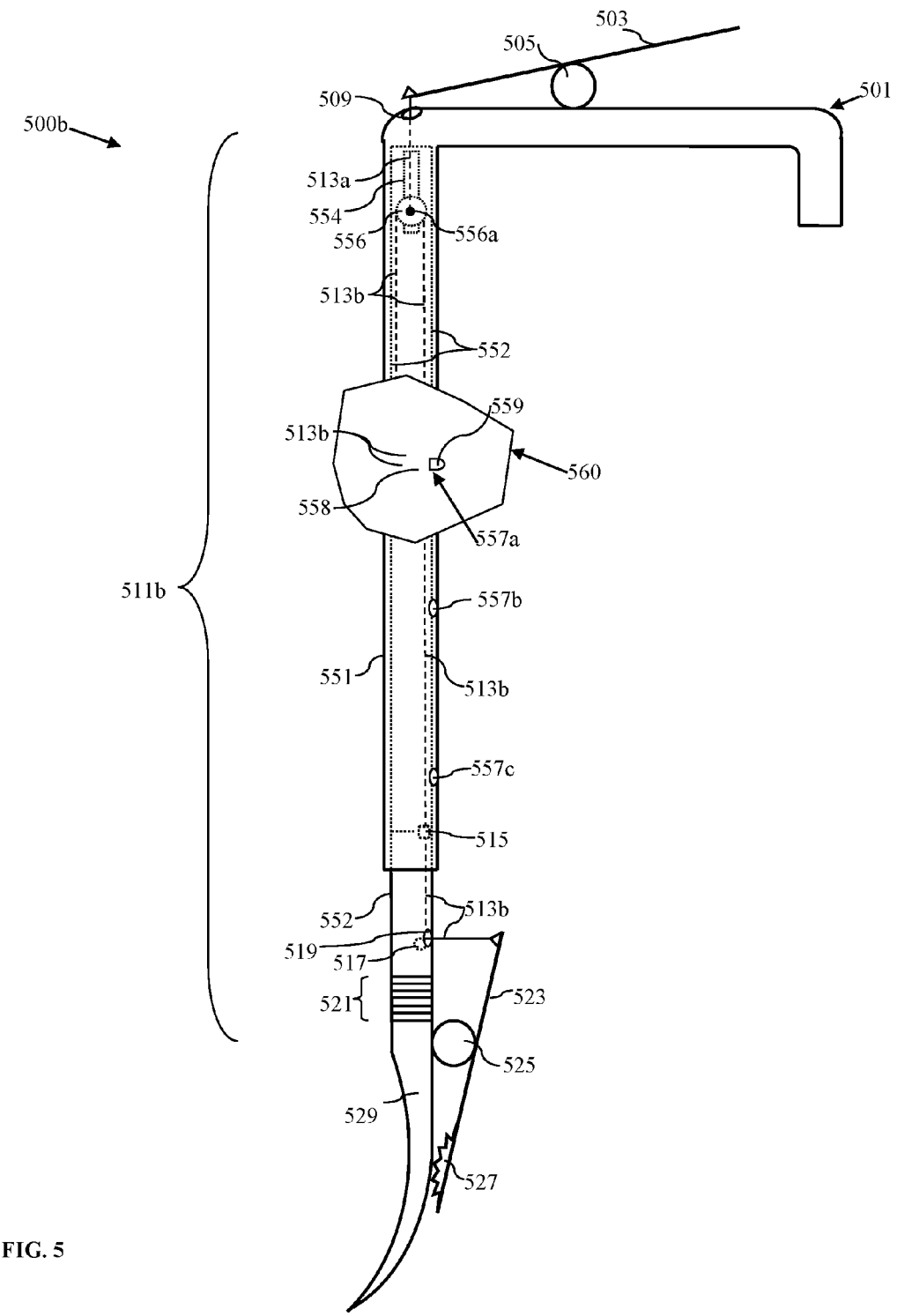
FIG. 5 illustrates a side view of a telescopic shoe horn apparatus, according to an embodiment.
Figure 6:
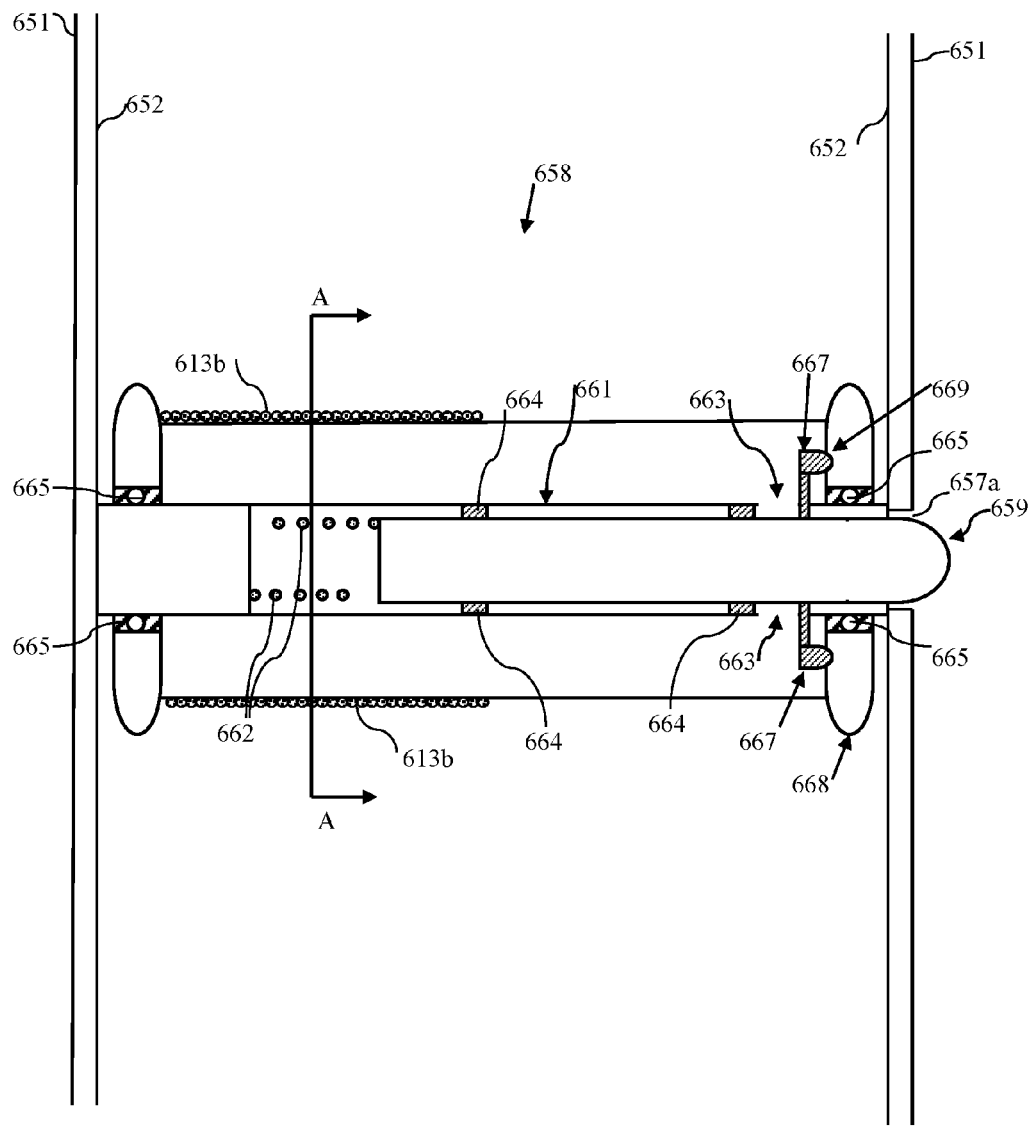
FIG. 6 illustrates a longitudinal sectional view of the reel portion 560 of the telescopic shoe horn apparatus from FIG. 5, according to an embodiment.
Figure 7:
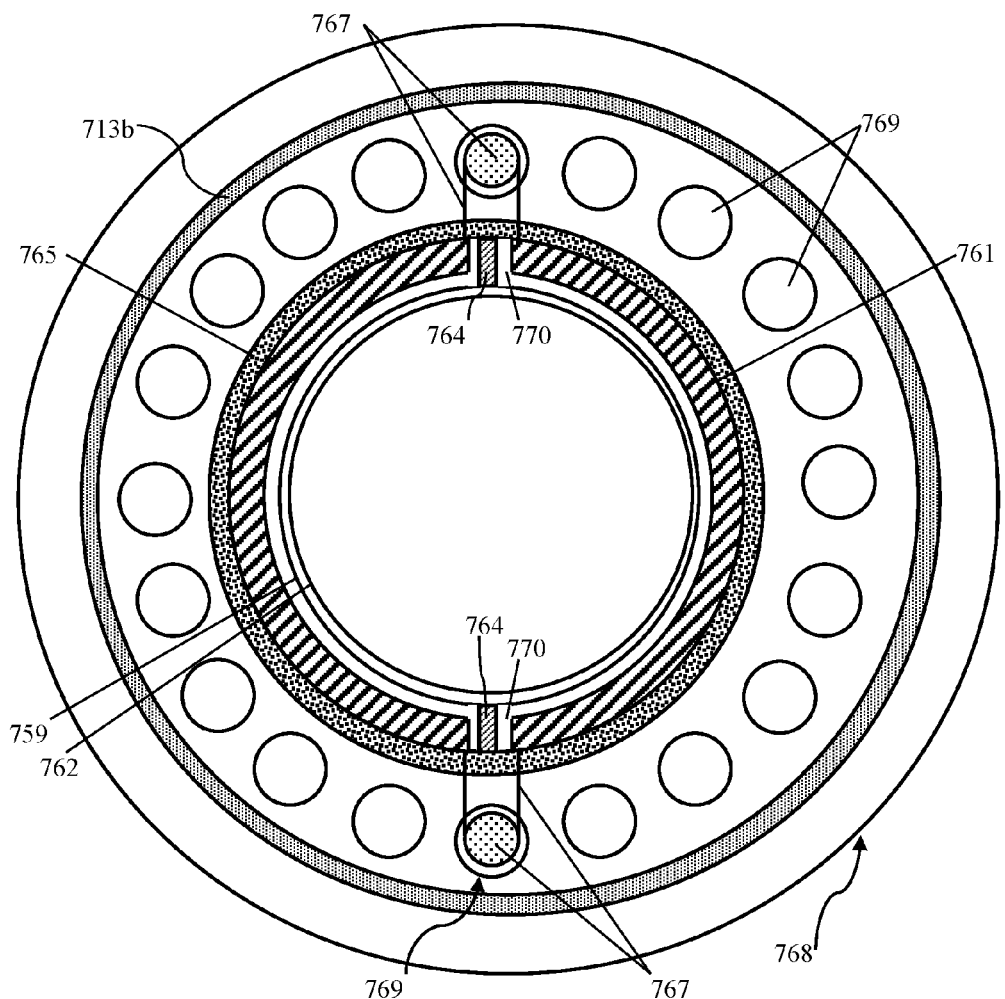
FIG. 7 illustrates a cross sectional view along line AA of the reel mechanism 558/658 of the telescopic shoe horn apparatus from FIG. 5, according to an embodiment.

FIG. 5 illustrates a side view of a telescopic shoe horn apparatus, according to an embodiment. FIG. 6 illustrates a longitudinal sectional view of the reel portion 560 of the telescopic shoe horn apparatus from FIG. 5, according to an embodiment. FIG. 7 illustrates a cross sectional view along line AA of the reel mechanism 558/658 of the telescopic shoe horn apparatus from FIG. 5, according to an embodiment. Reference will now be made to FIGS. 5-7 to describe the telescopic shoe horn apparatus. It should be understood that while a normally-closed telescopic apparatus is depicted in FIG. 5, the telescopic apparatus can be adapted to be a normally-open apparatus, by modifying the structure, attachment and function of the grip member 523, as described earlier when referring to FIGS. 3-4.

As shown in FIG. 5, the telescopic shoe horn apparatus 500b may have some identical structural elements as the normally-closed shoe horn apparatus 100 from FIG. 1 and the normally-open shoe horn apparatus 300a from FIG. 3, and several structural elements that are different or not present in these earlier described embodiments. The description from above of the identical elements (e.g., actuating member 103/303, shaft 111/311, spring loaded pivotal connections 105/125/305, etc) and their functions, shown in FIGS. 1-4, is incorporated hereby by reference, and thus, applies to corresponding elements shown in FIG. 5 (e.g., actuating member 503, spring loaded pivotal connections 505/525, grip member 523, etc). The description of the different or new structural elements and their functions is presented hereinafter.

It should be noted that in this embodiment the shaft 511b has a telescopic configuration and as such it is comprised of two parts, the outer shaft 551 and the inner shaft 552. As shown, the outer shaft 551 is attached at its upper end to the handle 501, is preferably hollow, and is open at its lower end to allow the sliding inside it of the preferably hollow inner shaft 552. The length of the telescopic shaft 511b can be adjusted to accommodate the needs of its users, who, for example, may be taller or shorter, or who may need to reach shoes (under a bed or desk for example), which are closer or farther. For example, to extend the length of the telescopic shaft 511b from the shown length (e.g., 19 inches) to a next length (e.g., 24 inches) or another, greater length (e.g., 31 inches), a user would need to release the spring loaded locking pin 559 from locking aperture 557a by pushing it inwards, and then pull the inner shaft 552 out of the outer shaft 551 until the locking pin 559 snaps back into the locking aperture (557b or 557c) corresponding to the desired shaft length. It should be understood that more or less than three locking apertures may be provided.

It should be noted that the mechanism for transferring the motion from the actuating member 503 to the grip member 523 has to be adapted to accommodate the selective adjustment of the telescopic shaft's length. As shown, such a mechanism may include at its upper end a rod 513a, which may exit the outer shaft 551 through opening 509 to associate with the proximal end of the actuating member 503. At its lower end, the rod 513a may be coupled to the axle 556a of a pulley 556, which can rotate around its axle 556a and which can also slide up a track 554, when pulled by rod 513a during actuation of member 503 by user.

As shown, the motion transfer mechanism further comprises a pull wire 513b, which is associated at its lower end with the upper end of grip member 523, enters into the inner shaft 552 through shaft opening 519, an is guided upwardly using one or more rollers 517 and/or eye hooks 515 anchored to the interior walls of the inner shaft 552, such that to bypass and not interfere with a reel 558 (see right side of wire 513b), passes over the pulley 556, and then comes down to roll (see 513b) on the reel 558 (locked by the locking pin 559 as it will be described hereinafter) to which the wire's upper end is attached. Thus, when a user pushes down the distal end of the actuating member 503, its proximal end will rise, pulling the rod 513a upwards, which will cause the pulley 556 to slide upwards as well on the track 554.

Since the upper end of the wire 513b is attached to the locked reel 558, and thus it cannot move, while the pulley 556 rotates and slides upwards, the lower end of the wire will pull the upper end of grip member 523 toward the inner shaft 552, which will cause the grip portion 527 to move away from the shoe horn 529 (i.e., open position of grip member). This, as it was described earlier, will allow for the shoe horn to be inserted into the shoe while leaving the grip portion 527 outside the shoe. Next, the release of the actuating member 503 by user will cause, under the influence of the spring loaded pivotal connections (e.g., torsion springs) 505 and 525, the return of the pulley 556 and the grip member 523 to their original position (i.e., close position as shown in FIG. 5).

As shown in FIGS. 6-7, the reel 658 may include a hollow reel axle 661/761, which is preferably secured at both ends into the interior wall of the inner shaft 652. As such, the reel axle 661 cannot move, except together with the inner shaft 652, such as when the user wants to change the length of the telescopic shaft 511b, as described earlier. Inside the hollow reel axle 661, a compression spring 662/762 may be placed to spring load the locking pin 659/759, which may slide inside the reel axle 661/761 guided by the four flanges 664/764 (two on each side), which travel inside the tracks 770 provided into the interior walls of the reel axle 661/761. It should be noted that this configuration prevents the locking pin 659/759 from rotating while allowing a user to unlock it by pushing it inwards, and upon release, under the influence of spring 662/762, allowing the locking pin to spring back into the lock position shown in FIGS. 5-7.

Secured to the locking pin 659/759 are the two opposite locking arms 667/767, which, when the locking pin 659/759 is in the locking position shown in FIGS. 5-7, lock the reel 658 by entering two opposite cavities of the circular plurality of cavities 669/769 provided into the back of right reel disk 668. Thus, the locking pin 559/659/759 has a dual function. First function is to allow user adjustment of the length of the telescopic shaft as described above. Second function is to unlock the reel 658 during shaft's length adjustment such that the reel can roll and unroll as necessary to permit the wire 513b/613b/713b to wind and unwind, such that the wire 513b is always stretched and tight inside inner shaft 552, no matter in which locking aperture 557a-b is the locking pin 559 locked. The wire being stretched and tight at all times is necessary for the motion transfer from the actuating member to the grip member to be proper. To achieve this goal, the reel 558 is preferably spring loaded similarly to a tape measure or dog reel leash recoil.

It should be noted that during telescopic shaft's length expansion, the spring loaded reel 558 may be forced to unroll, and thus allow unwinding of the wire/cable 513b while still remaining tight, by the pull out force exercised by the user onto the inner shaft 552. By contrast, during telescopic shaft's retraction, the reel spring (not shown) will cause the reel 558 to roll back, and thus cause the winding (see 613b) of the wire/cable 513b back onto the reel 558/658.

Referring to FIG. 6, cutouts 663 may be provided into the reel axle 661 to allow the locking arms 667 to slide back (left) during push back (left) of locking pin 659 to which they are attached, in order to unlock the reel 658 by removing the locking arms 667 from the reel cavities 669/769 as described earlier, and in the same time unlock the inner shaft 652 from locking aperture 657a of the outer shaft 651. Again, upon release of locking pin 659 by the user, under the influence of spring 662, the locking pin 659 and locking arms 667 will revert to locked position.

It should be noted that roller bearings 665/765 may be provided to facilitate low-friction rotation of reel 658, when unlocked, around reel axle 661/761.

Figure 8:
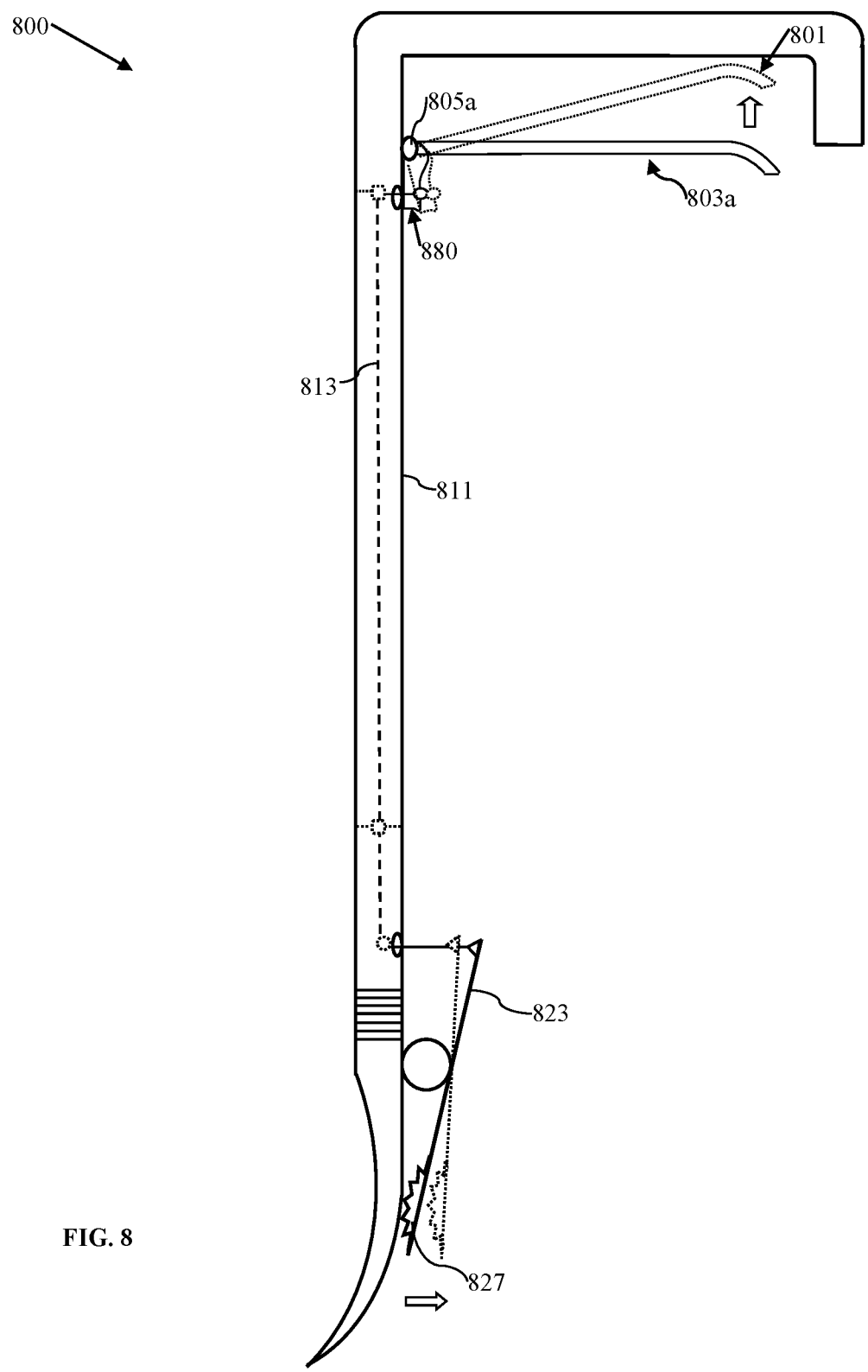
FIG. 8 illustrates a side view of a normally-closed shoe horn apparatus, according to another embodiment.

FIG. 8 illustrates a side view of a normally-closed shoe horn apparatus, according to another embodiment. This embodiment is similar with the embodiment depicted in FIG. 1 except for the differences shown in FIG. 8 and described hereinafter. As shown, the actuating member 803a of the shoe horn apparatus 800 is mounted below the handle 801. In its normal, non-actuated position, the actuating member 803a may have, as shown, a horizontal orientation. To actuate it, a user would need to simply pull up or squeeze (with the fingers for example) the actuating member 803a. A spring loaded pivotal connection 805a (e.g., torsion spring, spring loaded hinge, etc) may associate the actuating member 803a with the shaft 811. By using the spring loaded configuration, the actuating member 803a will return to its original position (shown in solid line) upon its release by the user.

As shown, the actuating member 803a may have a vertical arm 880 to which the upper end of wire 813 may be attached. Thus, when a user pulls up the actuating member 803a, as described above, the actuating member 803a and its vertical member 880 move to an actuated state (see dotted line). This causes the vertical arm 880 to move away from shaft 811 causing the wire 813 to pull the upper end of grip member 823 toward the shaft 811, and thus, causing the lower end with the grip portion 827 to open (see dotted line representation of the grip member 823 and grip portion 827).

It should be understood that all the other embodiments described herein, including the normally-open shoe horn apparatus depicted in FIG. 3, may be similarly adapted to have the actuating member below the handle as described above when referring to FIG. 8.

Figure 9:
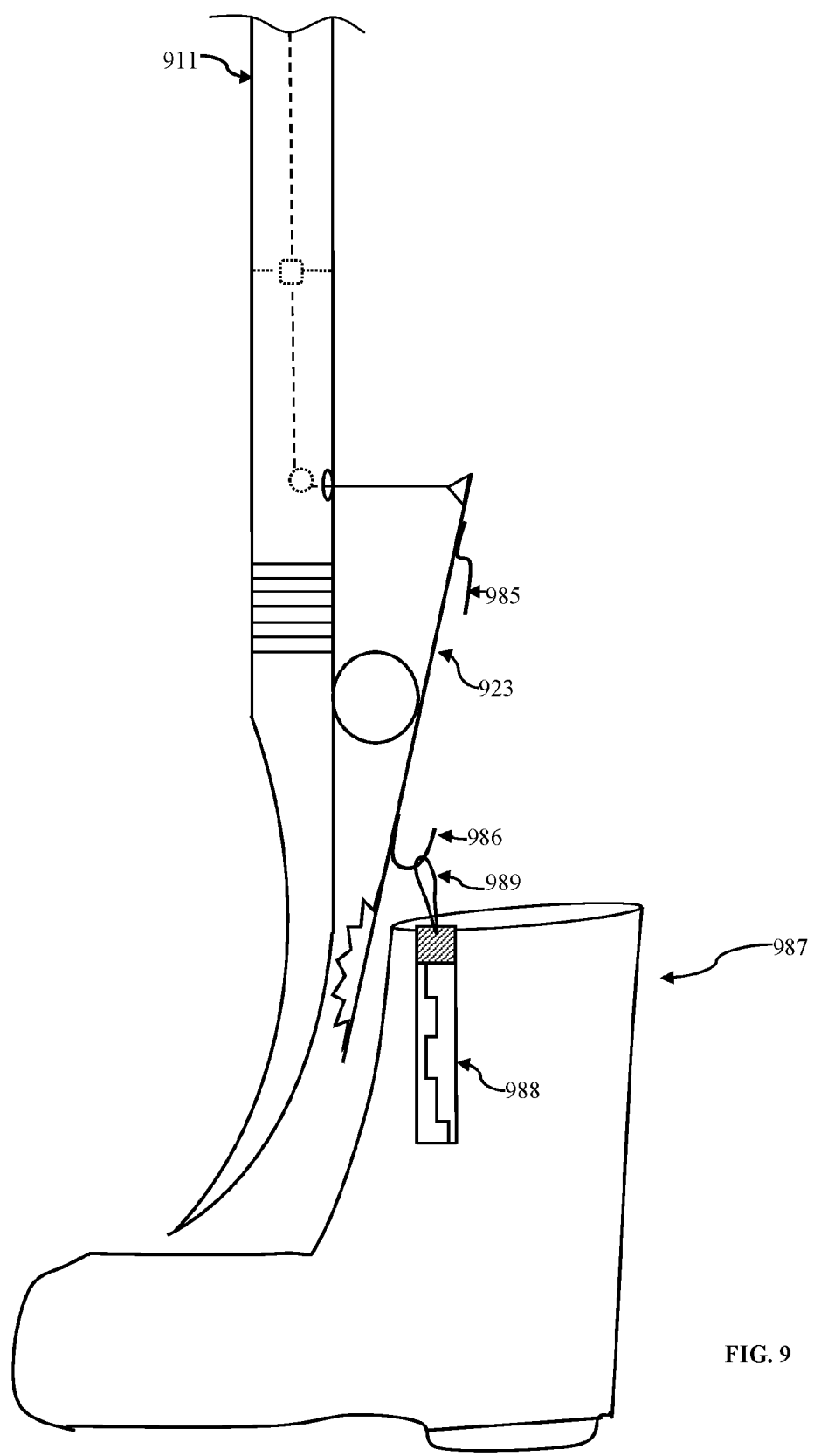
FIGS. 9-10 illustrate a side view of the bottom portion of the shoe horn apparatus from FIG. 1, according to yet another embodiment.
Figure 10:
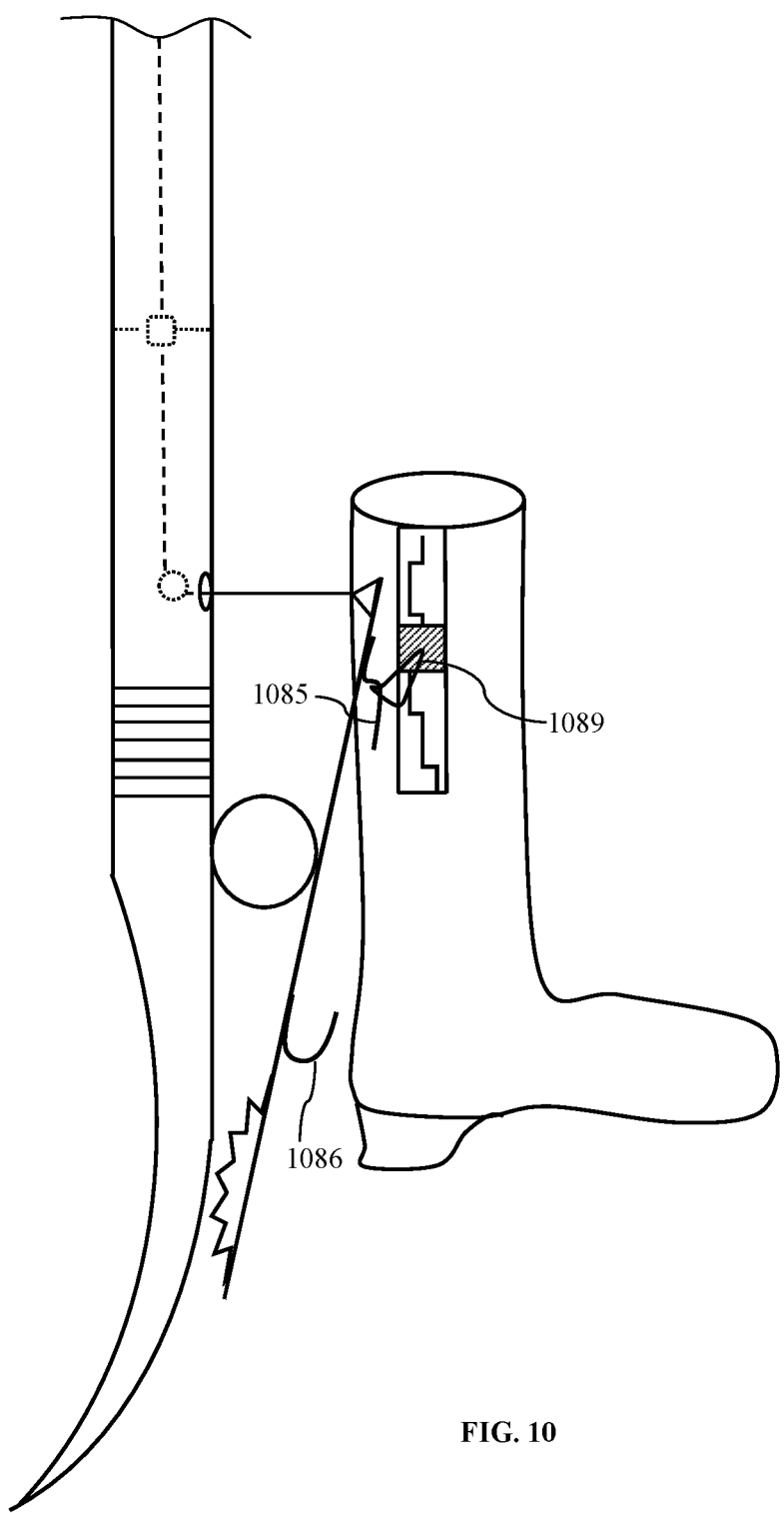

FIGS. 9-10 illustrate a side view of the bottom portion of the shoe horn apparatus from FIG. 1, according to yet another embodiment. As shown, the grip member 923 may be equipped, preferably on its back, with a pair of hooks, an upper zipper hook 985 (1085 in FIG. 10) and a lower zipper hook 986 (1086 in FIG. 10). The lower zipper hook 986 may be used by a user to zip the zipper 988 of a shoe or boot 987. The user would simply need to hold the shoe horn apparatus in her hand by its shaft 911 or its handle (101 in FIG. 1), insert the lower zipper hook 986 into the zipper eye 989 and pull up to zip zipper 988. Conversely, the upper zipper hook 985 may be used by a user to unzip the zipper 988 of a shoe or boot 987. The user would simply need to hold the shoe horn apparatus in her hand by its shaft 911 or its handle (101 in FIG. 1), insert the upper zipper hook 985/1085 (see FIG. 10) into the zipper eye 989/1089 and push down to unzip the zipper.

The hook feature described above may be very beneficial to, for example, people with mobility problems and people who for various reasons cannot or have difficulty bending over to zip and unzip a shoe or boot having a zipper. Here are some examples of such people who may benefit from using this feature: people with arthritis and/or back pain, people who are overweight, pregnant women, elderly, wheelchair bound individuals, persons who had hip or knee surgery, people having weight issues that prevent bending, and so on. As another example, the zip up and zip down function may be used by children (e.g., 5 years, 10 years or older) who have trouble sometimes zipping and unzipping winter boots for example.

In addition, it is easier for everyone to grab the shoe horn apparatus by its shaft or handle to pull up or push down a zipper rather than trying to pinch the zipper between thumb and finger and pull or push. For example, women could use this embodiment as a fashion dressing aid. Females struggle with zipping up boots in the winter time for example. Those zippers are typically small and are thus difficult to zip up. Also, women with long finger nails struggle with zippers and zippers are present today on many clothing articles, such as skirts, jackets, pants and so on. Particularly, zipping up a zipper of a pair of blue jeans is a struggle for many women. Some go to the length to invoke strange body movements, lying on the bed, on the floor, squatting, drawing in their stomach, and so on. This embodiment provides a solution for easy handling of all of these zippers.

It should be understood that all the other embodiments described herein, including the normally-open shoe horn apparatus depicted in FIG. 3, may be similarly adapted to have the pair of hooks as described above when referring to FIGS. 9-10.

Figure 11:
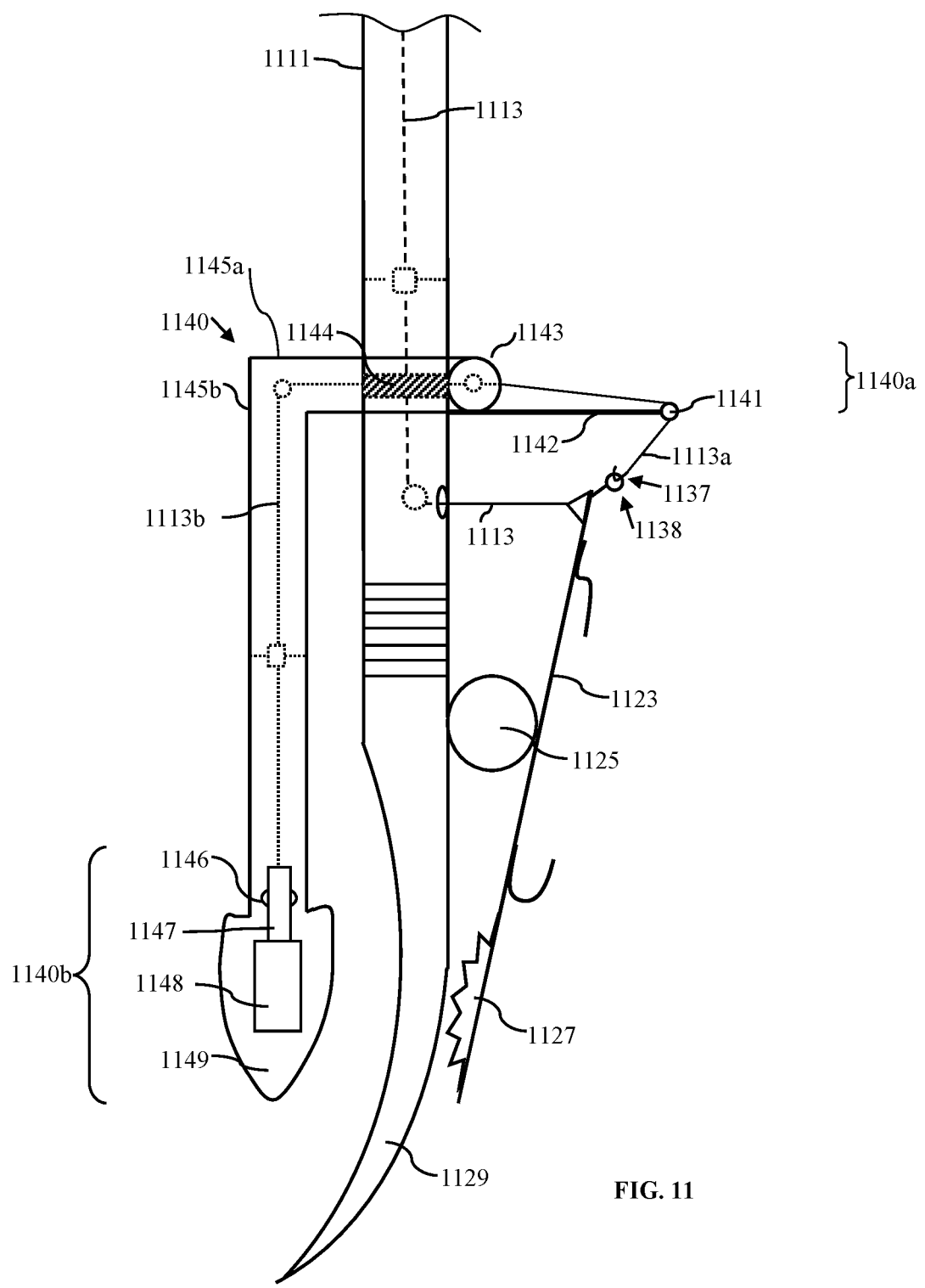
FIG. 11 illustrates the shoe horn apparatus from FIGS. 9-10 having attached to it a stocking fingers adapter 1140, according to yet another embodiment.
Figure 12:
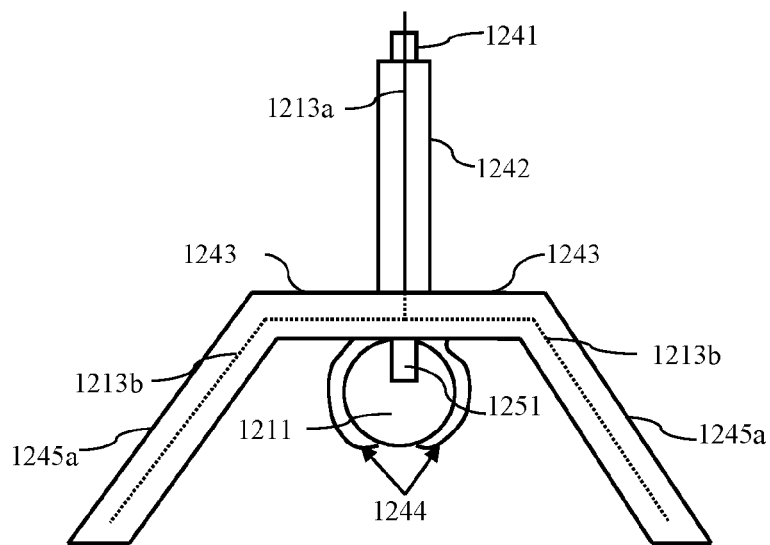
FIG. 12 illustrates a top view of the top portion 1140*a* of the stocking fingers adapter 1140 from FIG. 11.
Figure 13:
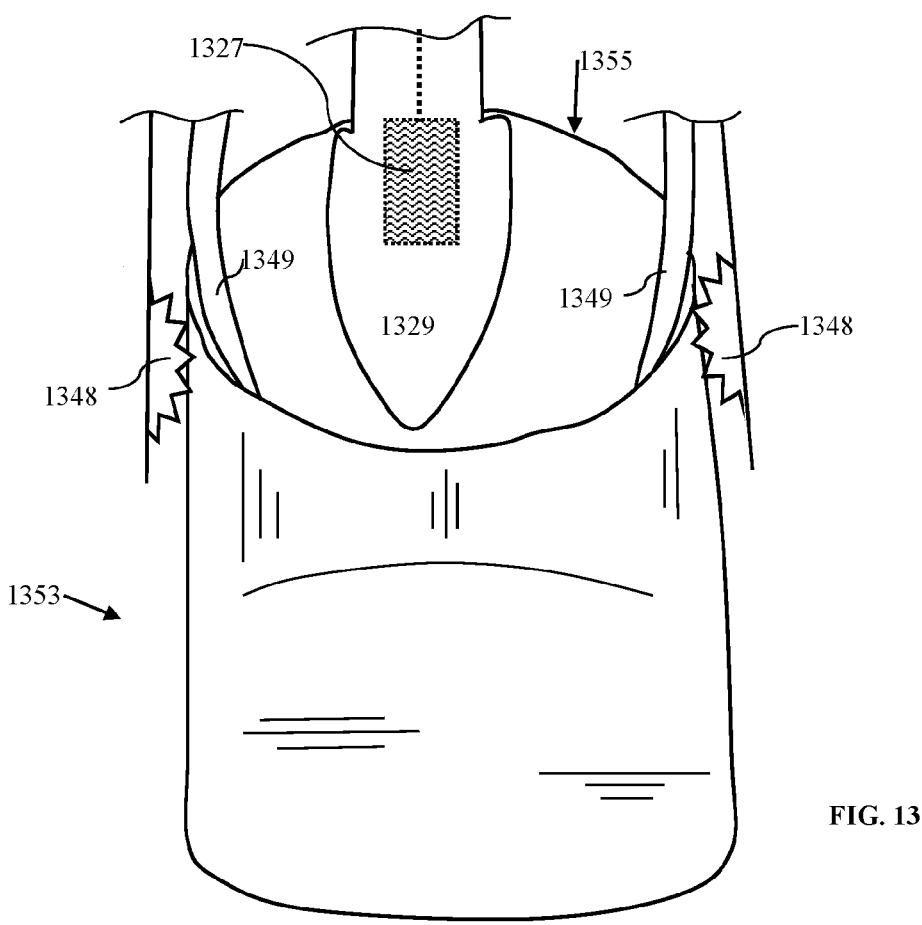
FIG. 13 illustrates how the embodiment from FIG. 11 operates on a sock.

FIG. 11 illustrates the shoe horn apparatus from FIGS. 9-10 having attached to it a stocking fingers adapter 1140, according to yet another embodiment. FIG. 12 illustrates a top view of the top portion 1140*a* of the stocking fingers adapter 1140 from FIG. 11. FIG. 13 illustrates how the embodiment from FIG. 11 operates on a sock. Reference will now be made to FIGS. 11-13 to describe the structure and function of the stocking fingers adapter 1140. As shown, the stocking fingers adapter ("stocking adapter") 1140 may include an extension bar 1142 (1242 in FIG. 12) having at its distal end an eye loop 1141 (1241 in FIG. 12). The extension bar 1142 provides leverage to the pull wire 1113*a* (1213*a* in FIG. 12), as it will be described in more details hereinafter.

To the top of the proximal end of extension bar 1142 a cross bar 1143 (1243 in FIG. 12) may be attached for supporting the horizontal arms 1145*a* (1245*a* in FIG. 12) and the vertical arm 1145*b* of the stocking fingers 1140*b* (left and right; left only shown in FIG. 11; the right one is a mirror image of the left one). The cross bar 1143, the horizontal arm 1145*a* and the vertical arm 1145*b* may be integrally formed and may be made of a similar pipe or tube as the shaft 1111, preferably smaller in diameter though. At the lower end of each (left and right) vertical arm 1145*b*, a stocking finger 1140*b* may be mounted.

Although smaller in size, each stocking finger 1140*b* may have a similar configuration, as the shoe horn 1129 and the grip member 1123 assembly. Specifically, each finger horn 1149 may have the shape resembling a shoe horn smaller in size. The finger grip 1148 may also resemble the grip portion 1127 or it may for example be similar to an alligator clip. The finger grip bar 1147 to which the finger grip 1148 is mounted may be similar to the grip member 1123. The finger grip bar 1147 is associated with the vertical arm 1145*b* via a spring loaded pivotal connection 1146, similarly as described earlier when referring to the grip member's 1123 association with shaft 1111 via spring loaded pivotal connection 1125 (see description of FIG. 1).

To the top end of each (left and right) finger grip bar 1147 a finger pull wire 1113*b* (1213*b* in FIG. 12) is preferably attached and then guided through a series of eye loops, rollers and the like, preferably up the hollow vertical arm 1145*b*, then through hollow horizontal arm 1145*a* (1245*a* in FIG. 12) and then towards the back center of the cross bar 1143 (1243 in FIG. 12). From the center of the cross bar 1143 the two finger pull wires 1113*b* may be guided out to eye loop 1141/1241 an then, with the aid of a hook 1137 mounted at each of their ends, the two pull wires may be fastened tightly into an eye hook 1138 attached to the upper end of grip member 1123. Alternatively, the two pull wires may be tied to a single finger actuating wire 1113*a*, inside the cross bar 1143 for example. This way, a user would only need to deal with one wire and one hook 1137 when choosing to install the stocking fingers adapter 1140 to the shoe horn apparatus.

For easy attachment and detachment by a user of the stocking fingers adapter 1140 to the shaft 1111/1211 a snap on buckle clamp 1144/1244 (see FIG. 12) attached to the cross bar 1143/1243 may be provided. A clamp guiding pin 1251 also attached to the cross bar 1143/1243 and a corresponding hole (not shown) into the shaft 1111/1211 may also be provided to assist the user and to ensure that the attachment of the stocking fingers adapter 1140 is made at the proper location on shaft 1111/1211, such that the finger pull wires are tight when connected to eye hook 1138.

Thus, when a user wishes to use the shoe horn apparatus to also help her put socks or stocking on her or someone else's feet (e.g., pregnant woman putting her socks on or her children's socks on their feet), the user would first need to attach the stocking fingers adapter 1140 to the shoe horn apparatus by simply snapping the clamp 1144/1244 onto shaft 1111/1211 guided by pin 1251, and then attach hook(s) 1137 to eye hook 1138. Next, the user would actuate the shoe horn apparatus, as described earlier when referring to FIG. 1, to open the grip portion 1127. As explained then, the wire 1113 would then pull the upper end of grip member 1123 toward shaft 1111. It should be noted that in the same time the hook 1137 will also move toward the shaft 1111 causing the tight finger pull wires 1113*b* to pull the upper end of finger grip bars 1147 towards the vertical arm 1145*b* and thus to open finger grips (left and right) 1148 by causing their movement away from the back of finger horns 1149.

Besides pregnant women, examples of users are people with back pain, elderly, wheelchair bound individuals, persons who had hip or knee surgery, people having weight issues that prevent bending, and so on.

Now, typically by using her hands, a user can place the sock or stocking opening 1355 into the three grips as shown in FIG. 13. As shown, the left and right finger horns 1349 would normally go inside the sock or stocking 1353 at opposite locations (diametrically opposite for example) and the finger grips 1348 outside the sock. The shoe horn 1329 would also go inside and the grip portion 1327 would go outside. Upon release of the shoe horn apparatus actuating member (103 in FIG. 1), all three grips would grip onto the sock opening and the user can now place her foot inside sock opening 1355 and pull the sock 1353 up the foot and up the leg, by pulling the shoe horn apparatus upwards by its shaft or handle.

It should be noted that while many variations may be adopted, it is preferred to configure the stocking fingers adapter 1140, such that the three grip points shown in FIG. 13 form a triangle, thus causing the formation of an oblong stock opening 1355, as shown. This may be achieved by using the exemplary structure configuration depicted in FIG. 12 (or other similar structures), ensuring that, as shown in FIG. 13, the finger horns 1349 and finger grips 1348 are laterally away and in front of shoe horn 1329 and grip portion 1327. Desirable stock opening dimensions may be for example six or seven inches wide by four or five inches deep, respectively.

The oblong shape of the stock opening 1355 at the top of sock 1353 makes it easier for the foot to slide into the sock. Further, the three point grip also allows the sock or stocking to be pulled tight all the way up the leg.

It should be understood that all the other embodiments described herein, including the normally-open shoe horn apparatus depicted in FIG. 3, may be similarly adapted to have the stocking fingers adapter 1140 as described above when referring to FIGS. 11-13.

It should be noted that the stocking fingers adapter 1140 does not interfere with the user using the shoe horn apparatus, and thus, it may be left clipped on or it may be mounted as a permanent attachment.

Figure 14:
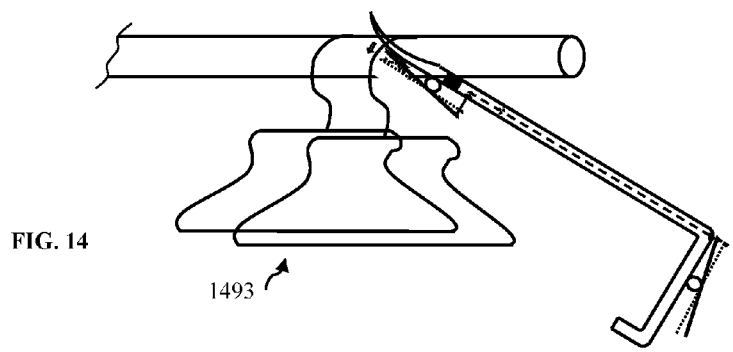
FIGS. 14-17 illustrate alternative uses of the disclosed shoe horn apparatus.
Figure 15:
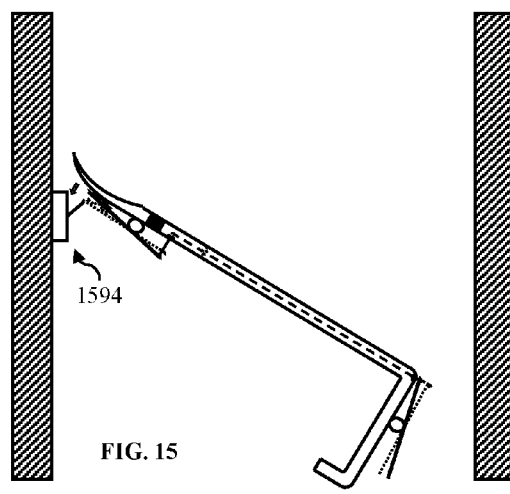
Figure 16:
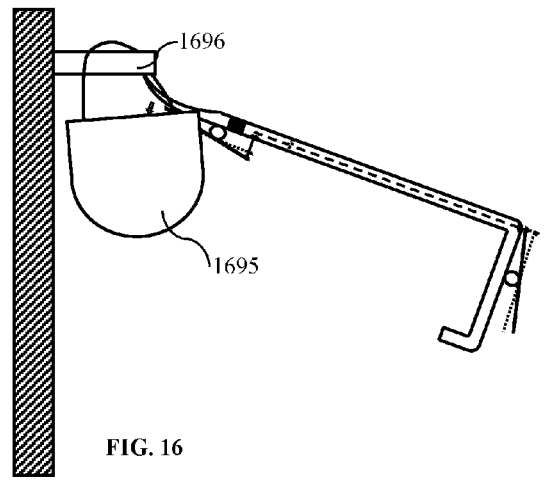
Figure 17:
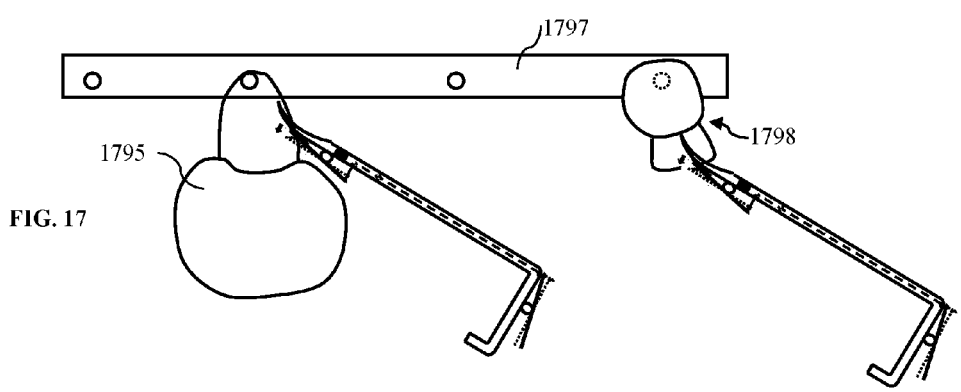

FIGS. 14-17 illustrate alternative uses of the disclosed shoe horn apparatus. As shown, besides the uses already described, putting shoes and socks on, zipping/unzipping, etc, the shoe horn apparatus disclosed herein may be used for various other uses, making it an extremely versatile, and thus, a very helpful tool to users, particularly to users with mobility issues. For example, the shoe horn apparatus may be used for hanging hangers 1493 with or without clothes as shown in FIG. 14, or clothes on and off the hangers. The shoe horn may be slipped under the hanger wire with the grip open, then the grip may be closed, thus grasping on the hanger wire for removal or hanging. This is particularly helpful for example for people with arthritis in shoulders and/or elbows and people in wheelchair or scooters.

As another example, it may also be used to turn a switch 1594 on and off, particularly when using the embodiment from FIG. 9, when the lower hook 986 for example may be conveniently used to pull down and thus turn off the switch 1594. As another example, the shoe horn apparatus may be used to hang on or retrieve from a bag 1695/1795 from a wall hook 1696 or a coat rack 1797. As yet another example a baseball hat 1798 can be grabbed for easy hanging or retrieving to and from a wall rack 1797. These are just a few examples. The number of uses of the shoe horn apparatus disclosed herein is limited only by the user's imagination. Basically, the shoe horn apparatus is an extended arm and finger grip (thumb/finger/hand).

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure.

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A shoe horn apparatus comprising: a handle at one end, a shoe horn at the other end and a shaft mounted between the handle and the shoe horn, wherein the shaft is mounted at its upper end to the handle and at its lower end to the shoe horn, the mounting of the shaft to the shoe horn comprising an elastic shaft portion which allows for angle variation between the shaft and the shoe horn during use of the shoe horn apparatus by a user; an actuating member having a proximal and a distal end and being associated with the handle through a first spring loaded pivotal connection; and, a wire associated with the proximal end of the actuating member and with a grip member having an upper extremity and a lower extremity and being associated with the shaft through a second spring loaded pivotal connection, such that the back of a shoe can be gripped between the back of the shoe horn and the grip member upon actuation or release of the actuating member by the user, to allow the back of the shoe to be pulled upwards by the user using the shoe horn apparatus, while the user's foot heel is being pushed downwards into the shoe and is sliding downwards onto the front of the shoe horn.

2. The shoe horn apparatus of claim 1, wherein the wire is attached at its lower end to the upper extremity of the grip member, wherein the grip member's default position is a closed, grip position, and wherein the grip member will open when the user pushes down on the distal end of the actuating member.

3. The shoe horn apparatus of claim 1, wherein the wire is attached at its lower end below the upper extremity of the grip member, wherein the second spring loaded pivotal connection is positioned at the upper extremity of the grip member, wherein the grip member's default position is an open position, and wherein the grip member will close and grip the back of the shoe when the user pushes down on the distal end of the actuating member, the strength of the grip being proportional with the strength with which the user pushes down the distal end of the actuating member.

4. The shoe horn apparatus of claim 1, wherein the grip member has an indented grip portion near its lower extremity, configured to provide increased friction between the grip member and the back of the shoe.

5. The shoe horn apparatus of claim 1, wherein the grip member has a hook at its lower extremity, configured to grab onto the shoe heel's lip.

6. The shoe horn apparatus of claim 1, wherein the shaft is hollow, and wherein a portion of the wire is guided inside the shaft through a plurality of rollers and eyehooks.

7. The shoe horn apparatus of claim 1, wherein the elastic shaft portion is a spring mounted between the shaft and the shoe horn.

8. The shoe horn apparatus of claim 1, wherein the shaft is telescopic, allowing the user to adjust the length of the shoe horn apparatus to a plurality of lengths.

9. The shoe horn apparatus of claim 8, further comprising a spring loaded reel on which a portion of the wire near the wire's upper end rolls during contraction of the shaft and unrolls during expansion of the shaft by the user, such that to maintain the wire in a stretched position.

10. The shoe horn apparatus of claim 9, further comprising a pulley, which guides the wire, and a track, on which the pulley slides during actuation of the actuating member by the user.

11. The shoe horn apparatus of claim 10, wherein the shaft comprises an inner portion and an outer portion, and wherein the reel comprises a spring loaded lock pin which can be actuated by the user to simultaneously unlock the reel and the inner portion of the shaft from the outer portion of the shaft.

12. The shoe horn apparatus of claim 11, wherein the lock pin is guided by a plurality of flanges while sliding inside a hollow reel axle fastened to the inner portion of the shaft, during actuation or release by the user.

13. The shoe horn apparatus of claim 12, further comprising at least a locking arm fastened to the lock pin, wherein the reel has a plurality of concavities, and wherein, upon release of the lock pin by the user, the at least a locking arm locks the reel by entering at least one of the plurality of reel concavities.

14. A shoe horn apparatus comprising: a handle at one end, a shoe horn at the other end and a shaft mounted between the handle and the shoe horn, wherein the shaft is mounted at its upper end to the handle and at its lower end to the shoe horn, the mounting of the shaft to the shoe horn comprising an elastic shaft portion which allows for angle variation between the shaft and the shoe horn during use of the shoe horn apparatus by a user; a spring loaded actuating member mounted near the handle, such that it can be actuated by the user with the same hand the user holds the handle with; a spring loaded grip member mounted near the shoe horn such that it can grip the back of a shoe between the back of the shoe horn and the grip member upon actuation or release of the actuating member by the user; and, a transmission mechanism mounted between the actuating member and the grip member.

15. The shoe horn apparatus of claim 14, wherein the transmission mechanism comprises a wire guided by a plurality of rollers and eye hooks.

16. The shoe horn apparatus of claim 14, wherein the grip member comprises a pair of opposite hooks to assist the user with the zipping and unzipping of zippers.

17. The shoe horn apparatus of claim 14, further comprising a stocking fingers adapter removably attached to the shoe horn apparatus and having two stocking fingers operable from the actuating member at the same time the grip member is operated, such that to allow a simultaneous three point grip on a sock or stocking opening.

18. The shoe horn apparatus of claim 17, wherein each stocking finger comprises a finger horn and, behind the finger horn, a spring loaded finger grip.

19. The shoe horn apparatus of claim 18, wherein the three point grip can be obtained by the grip member gripping the back of the sock or stocking opening while the shoe horn is inside the sock or stocking, and while one of the two stocking fingers grips the left side and the other grips the right side of the sock or stocking opening while the finger horns are both inside the sock or stocking and the finger grips are both outside the sock or stocking.

20. A method of putting shoes on using a shoe horn apparatus comprising a handle at one end, a shoe horn at the other end and a shaft mounted between the handle and the shoe horn, wherein the shaft is mounted at its upper end to the handle and at its lower end to the shoe horn, the mounting of the shaft to the shoe horn comprising an elastic shaft portion which allows for angle variation between the shaft and the shoe horn during use of the shoe horn apparatus by a user, a spring loaded actuating member mounted near the handle, such that it can be actuated by the user with the same hand the user holds the handle with, a spring loaded grip member mounted near the shoe horn such that it can grip the back of a shoe between the back of the shoe horn and the grip member upon actuation or release of the actuating member by the user, and, a transmission mechanism mounted between the actuating member and the grip member, the method comprising the following steps:

holding the shoe horn apparatus in one hand by the handle;

placing a foot of the user in a shoe and the shoe horn between the foot's heel and back of the shoe;

actuating or releasing the actuating member such that to cause the grip member to grip the back of the shoe; and pulling the shoe horn apparatus, and thus the back of the shoe, upwards, while pushing the foot's heel downwards.

\* \* \* \* \*